(12) United States Patent
Thenthiruperai

(10) Patent No.: US 7,602,899 B1
(45) Date of Patent: Oct. 13, 2009

(54) METHOD AND SYSTEM FOR CALL ROUTING BASED ON OBTAINED INFORMATION

(75) Inventor: Balaji S. Thenthiruperai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1039 days.

(21) Appl. No.: 10/781,966

(22) Filed: Feb. 18, 2004

(51) Int. Cl.
*H04M 3/00* (2006.01)
(52) U.S. Cl. .............................. 379/265.02; 379/265.13
(58) Field of Classification Search ................ 379/201, 379/265.02, 266, 207, 265.13
See application file for complete search history.

(56) References Cited

U.S. PATENT DOCUMENTS

| 4,874,963 | A  | * | 10/1989 | Alspector ..................... 706/34 |
| 7,043,439 | B2 | * | 5/2006  | Jost et al. .................... 704/275 |
| 7,068,775 | B1 | * | 6/2006  | Lee ....................... 379/265.02 |
| 7,210,098 | B2 | * | 4/2007  | Sibal et al. ................... 715/205 |
| 7,251,604 | B1 | * | 7/2007  | Thenthiruperai ......... 704/270.1 |
| 2002/0055916 | A1 | * | 5/2002 | Jost et al. ....................... 707/1 |
| 2003/0059016 | A1 | * | 3/2003 | Lieberman et al. ..... 379/201.03 |
| 2003/0084144 | A1 | * | 5/2003 | Lipinski ...................... 709/224 |
| 2004/0057570 | A1 | * | 3/2004 | Power et al. ........... 379/265.13 |

OTHER PUBLICATIONS

Telecom Products Document, Telecommunications, ICP Corp., 2001-2002.
Steven Cox., *Discriminative Techniques in Call Routing*, School of Information Systems, University of East Anglia, Norwich NR4 7TJ, U.K. (Apr. 2003).
Stephen Cox and Gavin Cawley, *The Use of Measures in Vector Based Call-Routing*, School of Information Systems, Uniersity of East Anglia, Norwich NR4 7TJ, U.K. (Sep. 2003).

* cited by examiner

*Primary Examiner*—Curtis Kuntz
*Assistant Examiner*—Amal Zenati

(57) ABSTRACT

A method and system for routing incoming calls by assigning weights to the call. A method in accordance with an embodiment of the invention comprises receiving an incoming call, generating one or more prompts to solicit respective responses from the caller and receiving, from the caller, the respective responses. The method further comprises assigning one or more respective weights to the call, the one or more respective weights corresponding to each of the one or more responses, processing the weights to determine one or more overall weights of the call, and routing the call to an appropriate location based, at least in part, on the overall weights of the call.

29 Claims, 4 Drawing Sheets

METHOD AND SYSTEM FOR CALL ROUTING BASED ON OBTAINED INFORMATION

BACKGROUND

I. Field of the Invention

This invention is directed to systems and methods for routing incoming calls, such as at a customer care center. More particularly, this invention is directed to systems and methods for routing calls based on weights assigned to events that occur during such calls.

II. Description of Related Art

Customer care centers that receive incoming calls from customers are a common operation in many businesses. For small to medium size businesses, customer care centers may be staffed by a relatively small number of people with little capital equipment being used. However, for some businesses, such as large corporations selling consumer products and/or services (e.g., telecommunications services), customer care centers may have numerous customer service representatives (CSRs) in different business areas, which may even be geographically diverse. Such larger customer care centers often utilize automated call handling equipment for receiving and routing incoming calls.

Such automated call routing equipment often takes the form of one or more Integrated Voice Response (IVR) systems. Such IVR systems are known and provide for accepting an incoming call (e.g. from a customer) and obtaining information from the caller to be used in routing the call. To obtain this information, the IVR system uses one or more prompt/response sequences. A prompt/response sequence consists of the IVR providing a prompt (such as an audio prompt) and receiving a response from the caller (customer or potential customer) to the prompt. For example, the prompt may ask the user for an account number. In response, the customer may either state their account number or may enter it using dual-tone multi frequency (DTMF) signals by depressing telephone keys. Once the response is received, a predetermined (e.g., fixed) hierarchy is traversed and the customer is routed to a next prompt/response sequence. Based on the prompt/response hierarchy of the IVR, the caller is, at different points in the hierarchy, routed to a CSR or a call queue for a group of CSRs.

In this regard, for relatively large customer care centers, different types of CSRs may exist. For example, there may be general CSRs that handle routine matters. Also, there may be specialist CSRs that are responsible for addressing customer concerns in specific areas of the business, such as billing CSRs or new product specialist CSRs.

One drawback of a fixed prompt/response hierarchy is that the potential exists to route a customer call to an inappropriate CSR (or a less appropriate CSR to handle a specific issue). By way of example, a situation where a customer calls with a question regarding his/her invoice for a new product purchase is considered. It is assumed this customer traverses an IVR prompt/response hierarchy and indicates that they are calling about a billing issue. In such a fixed hierarchy system, the customer would be routed to a billing CSR when it may be more appropriate for them to speak with a new product specialist CSR. Of course, numerous other examples of such potential inappropriate routing exist.

Another drawback of fixed hierarchy systems is that they do not provide for any prioritization or classification of customer calls. For example, if a company offers premium services that customers pay for, or are granted based on, e.g., the volume of business the customers do with the company, a fixed hierarchy system does not readily allow for preferential handling of calls from such customers.

One approach that has been proposed to address such shortcomings in call routing is the use of call vectoring. Call vectoring is described, for example, in *Discriminative Techniques in Call Routing*, Stephen Cox—April 2003 and *The Use of Confidence Measures in Vector Based Call-Routing*, Stephen Cox and Gavin Cawley—September 2003. Call vectoring is a natural-language interpretation based call routing technique. In this respect, a call vectoring based routing technique routes calls based on words and/or strings of words that are extracted from what is spoken by a caller. In such approaches, the caller speaks in "natural" language, as if talking to a CSR (a person), rather than to a computer based language interpreter. Based on the extracted words and/or strings of words, calls are routed over a routing matrix using predictive statistics. Because such approaches operate using natural language as input, they are highly prone to error due, in part, to the innumerable variations in possible descriptions that must be accounted for, as well as speech patterns and vocal inflections. For example, errors of over 10% were seen in a testing environment for such approaches (See Cox and Cawley, § 3.1). The error rate using such techniques in practical applications would likely be much higher given the infinite possible combinations of descriptions, as well as the varied speech and language patterns of a diverse customer base. Based on the foregoing, alternative approaches for implementing a customer care call center are desirable.

SUMMARY

According to an exemplary embodiment, a system for routing an incoming call from a caller comprises a telephony interface for receiving the incoming call from the caller. The telephony interface may take the form of a voice modem, which is modem that supports telephone functions, such as sending and receiving voice audio information. The system further comprises a prompt generation unit that is coupled with the telephony interface. The prompt generation unit generates one or more prompts to solicit responses from the caller, such as requesting an account number. The prompt generation unit may include a text-to-speech converter and/or a digital audio player for generating the one or more prompts The system also comprises a response processing unit coupled with the telephony interface and the prompt generation unit. The response processing unit receives, from the caller, responses to the one or more prompts. The response unit then processes the responses to assign one or more respective weights to the call. The one or more respective weights correspond with each of the responses given by the caller. For example, for the situation given above where a customer is calling with a question about an invoice for a new and/or recently released product purchase, the customer indicating they have a billing question may result in a first weight (e.g. with a value of "2") being added to a billing category. However, the fact that the customer has recently purchased a new and/or recently released product (which may be indicated based on the customer's identity/account number) may result in a second weight (e.g. with a value of "6") being added to a new product category, thus indicating it is more appropriate to have the customer speak with a new product specialist CSR.

The exemplary system further includes a data compilation unit coupled with the prompt generation unit and the response processing unit. The data compilation unit processes the weights assigned to the call in each of the weight categories to determine one or more overall weights of the call. For example, the data compilation unit may compile weights in a classification category (e.g., that may indicate the caller is a preferred customer), a priority category (e.g., that may indicate the customer's issue is critical and needs immediate attention), a billing category, a new product category, a technical support category, among numerous other categories. The system may then determine, based on the processed weights, how the call should be treated (e.g., normally handled or preferentially handled) and which CSR (or class of CSRs) the call should be routed to, among other determinations.

In the exemplary system, a call routing unit, which is coupled with the data compilation unit, determines how the call should be treated, determines which CSR (or class of CSRs) the call should be routed to and routes the call to an appropriate location using an appropriate call routing algorithm. The call routing unit may implement a heuristic method to route incoming calls based on the information supplied to the call routing unit by the data compilation unit. Such heuristic methods include, but are not limited to, simulated-annealing methods and traveling salesman problem solution methods.

It is noted that the components of the exemplary system may be implemented in any number of ways. For example, the components may be implemented in software, hardware and/or firmware, such as in a general purpose computing platform. Alternatively, the components may be implemented in a special purpose system, such as a system that is specifically designed to implement such call routing functions.

In this respect, an exemplary machine for processing user responses associated with an incoming call comprises a prompt generating unit for providing one or more response soliciting prompts to a caller (e.g. customer). Again, the prompt generation unit (and other components of the exemplary machine) may be implemented in hardware, software and/or firmware, or by any other appropriate techniques. The prompt generating unit may include a text-to-speech generator and/or a digital audio player, for example.

The machine further comprises a response receiving unit, which is coupled with the prompt generating unit, for receiving respective responses from a caller to the one or more prompts. The response receiving unit may be a grammar based speech interpreter, for example, though the invention is not so limited. In this context, a grammar based speech interpreter is a speech recognition engine (which may be implemented in hardware, software and/or firmware) that recognizes caller responses based on a defined grammar. A grammar defines a set of recognized responses, or the utterances ("phonemes") that correspond to recognized responses. The response receiving unit then assigns one or more weights based on the responses received from the caller to each prompt.

The exemplary machine further comprises a data compiling unit coupled with the response receiving unit. The data compiling unit processes the respective weights to determine at least one overall weight. The overall weights may then be used (such as by a call routing unit) to determine a priority and classification of the call as well as to determine what type of CSR, relative to the other types of CSRs, would be the most appropriate to handle the call. Such a machine is advantageous over fixed hierarchy systems as it reduces the occurrence of routing calls to inappropriate CSRs. Such a machine is also advantageous over call vectoring systems as the interpretation of spoken responses is limited to a list of acceptable responses and call routing may also be based on non-speech recognition events.

An exemplary method for routing an incoming call may be implemented, for example, in the system or the machine described above. Such a method may be implemented as a set of machine executable instructions that may be included, for example, on a compact disk, hard-disk drive, or any other suitable storage medium. The method comprises receiving the incoming call, generating one or more prompts to solicit respective responses from the caller and receiving, from the caller, the respective responses. The method further comprises assigning one or more respective weights to the call, the one or more respective weights corresponding respectively to each of the one or more responses, processing the weights to determine one or more overall weights of the call, and routing the call to an appropriate location based, at least in part, on the overall weights of the call. The method has the attendant advantages of the exemplary system and machine that were discussed above.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION

Exemplary System for Call Routing

Figure 1:
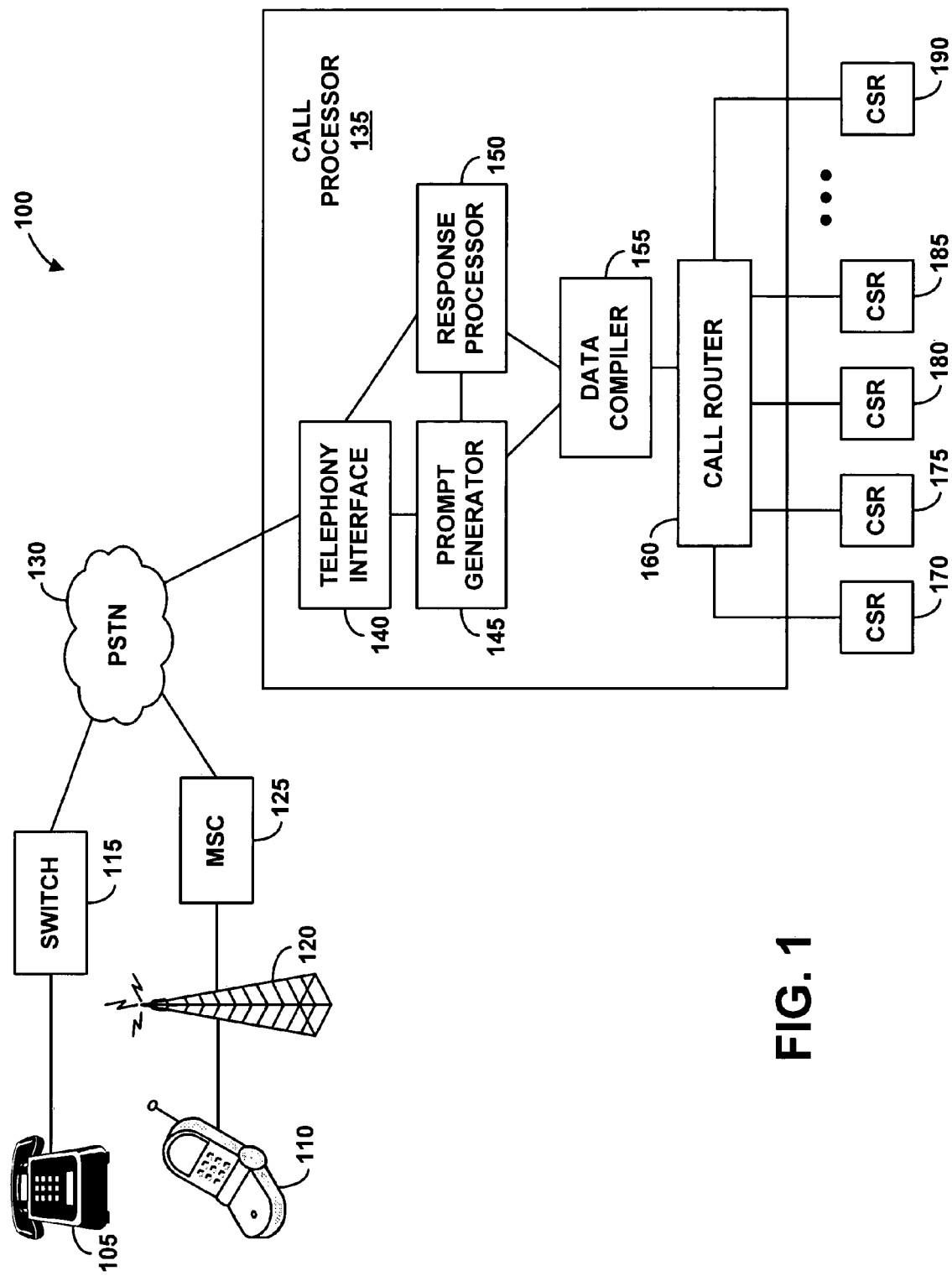
FIG. 1 is a diagram illustrating a call routing system in accordance with an embodiment of the invention.

Referring now to FIG. 1, a diagram illustrating an exemplary system 100 for routing an incoming call from a caller is shown. The system 100 comprises a landline phone 105 and a mobile phone 110. These devices are, of course, exemplary and numerous other devices may be used in connection with embodiments of the invention. The landline phone is coupled with a switch device 115, while the mobile phone is coupled with a base station 120 (which includes a base station transceiver and a base station controller). The base station 120 is then coupled with a mobile switching center (MSC) 125. The base station 120 handles radio communication to and from the mobile phone and the MSC 125 operates as a switch device for the mobile (in an operatively similar fashion as the switch device 115 for the landline phone 105). The switch device 115 and the MSC 125 are both coupled with a public switched telephone network (PSTN) 130. These connections provide for callers to use the landline phone 105 and/or the mobile phone 110 to contact a customer care center call processor 135, which is also coupled with the PSTN 130.

The call processor 135 comprises a telephony interface 140 that is coupled with the PSTN 130. The telephony interface 140 may take the form of any number of devices that are capable of receiving calls via the PSTN 130. It will be appreciated that the call processor 135 may be coupled with communications networks other than a PSTN. For example, the call processor 135 may be coupled directly with the MSC 130 and not be directly accessible (or accessible at all) through the PSTN 130. As another alternative, the call router may be coupled with a packet data network (not shown) and may send and receive voice information using Voice Over Internet Protocol (VoIP) communication, which is known to those working in this area. Still other possible configurations exist as well.

For the system 100, the telephony interface 140 may take the form of a voice modem. As was described above, a voice modem is a modem that is capable of sending and receiving voice/audio (e.g., non-digital data) information. A voice modem is essentially a modem that incorporates the functionality of a telephone and may further include an auto-answer device, answering machine functions, among other features. For the system 100, the telephony interface 140 (in the form of a voice modem) operates as a transceiver to provide prompts to callers connected with the call processor 135 from landline phone 105 and/or mobile phone 110. The telephony interface 140 also receives the caller's response to these prompts, which may be either spoken responses or dual-tone multi frequency (DTMF) responses generated by depressing phone keys. As previously discussed, the telephony interface 140 may be implemented using hardware, software and/or firmware.

The system 100 also comprises a prompt generation unit 145, which is coupled with the telephony interface 140. The prompt generation unit 145 (hereafter "prompt generator") provides audio prompt information (intended to solicit one or more responses for a caller) to the telephony interface 140. The audio prompt information is, in turn, provided to a caller by the telephony interface 140 and the PSTN 130 (as well as the switch 115 or the MSC 125 and the base station 120).

The prompt generator 145 may use any suitable approach for providing audio prompt information to the telephony interface 140. For example, the prompt generator 145 may comprise a text-to-speech generator. In this situation, the prompt information may be included in one or more text files stored in call processor 135, such as on a data storage device (not shown). Alternatively, the prompt generator may comprise a digital audio player. In this situation, the prompt information may be included in one or more digital audio files, such as wave files, Windows Media Audio files and/or mp3 files, among any number of other file types. The digital audio files may be stored in the call processor 135 in a similar fashion as text files, such as by using a data storage device (e.g., a hard disk drive).

The system 100 further comprises a response processing unit 150 (hereafter "response processor"). The response processor 150 is coupled with the telephony interface 140 and the prompt generator 145. The response processor 150 operates cooperatively with the prompt generator 145 to receive, from a caller, responses to prompts generated by the prompt generator 150. In this regard, the prompt generator 145 and the response processor 150 may include interrelated software programs. Alternatively, the prompt generator 145 and the response processor 150 may be implemented using interrelated hardware and/or firmware in place of, or in addition to software.

The response processor 150 also processes the responses received from the caller. In processing the responses, the response processor 150 compares the caller's response with a set of expected or likely responses. The set of likely responses may be included in, for example, a grammar associated with the particular prompt that the caller is responding to. As was previously discussed, a grammar defines a set of recognized responses, or the utterances ("phonemes") that correspond to recognized responses. The grammar may then be employed by a speech recognition engine (included in the response processor 150) to determine if the received response matches one of the recognized responses defined in the grammar. For such an embodiment, the prompts and grammars may be included in one or more browser pages (e.g., voice browser pages) as will be discussed in further detail below.

The response processor 150, in processing responses, also assigns one or more respective weights to the call. Weights are assigned based on the responses provided by the caller. If the user provides useful information (e.g., an expected response) in response to a prompt, one or more weights may be assigned to the caller's call, as will be discussed further below. If the user provides un-useful information (e.g., an unexpected response) weights of zero, or no weights at all may be assigned to the call. In this situation, depending on the particular embodiment, the caller may be re-prompted or, alternatively, the call may be routed to a general CSR to service the caller, as two possible examples. The weights assigned to the caller's call may also be assigned in categories. For example, weight categories may include "classification", "priority", "billing", "new product", "technical support", among any number of other categories.

The following is an example of how weights might be assigned to a caller's call. The example is presented as "prompt", "response" and "weights." The example is consistent with the previously discussed example, where a customer has recently purchased a new product. Further, the example assumes that the call has just been received and answered by the telephony interface. It is noted that this example is merely for purposes of illustration, is relatively simple in nature and, of course, does not limit the scope of the invention. Each category has a maximum value of 10 for this example.

EXAMPLE 1

| Prompt | Response | Weights |
| --- | --- | --- |
| Please enter or state account number. | 12345 (Voice or DTMF) | Classification: 10 (Premium customer) |
| Please state whether you have a billing, technical support, new product or general question. | Billing | Billing: 3<br>New product: 8 (Due to recent purchase associated with account number) |
| Is your question regarding a recent purchase? (Due to recent purchase) | Yes | Billing: −3<br>New product: 2 |

After the prompt/response sequence set forth above in Example 1 is complete, a trigger point may be defined in the prompt/response hierarchy of the system 100. Such trigger points will be discussed in further detail below. As result of encountering such a trigger point, the information collected during the prompt/response sequence of Example 1 is sent to a data compilation unit 155 (hereafter "data compiler"), which is coupled with the prompt generator 145 and the response processor 150. The data compiler 155 processes the weights assigned during the prompt/response sequence, for this example, by calculating the sum of the weights added in each category. The result of this processing will be three "overall weights." These weights will be Classification=10, Billing=0, New product=10. It may be seen that even though the caller indicated that they had a billing issue, because of the weights assigned to the call, the overall billing weight is zero. Again, the data compiler may be implemented using software, hardware and/or firmware. Additionally, any number of compilation techniques may be used, such as taking the product of the assigned weights in each category. The invention is, of course, not limited to any particular data compilation technique.

Furthermore, the weighting of events (prompt/response sequences) may or may not take into account the weighting of prior events for a particular call. In this regard, for the foregoing example, the weighting of the third event, for some embodiments, may take into account the weighting of the second event, while in other embodiments the third event may be weighted independently of the second event (and all other events) associated with a particular call.

Figure 2:
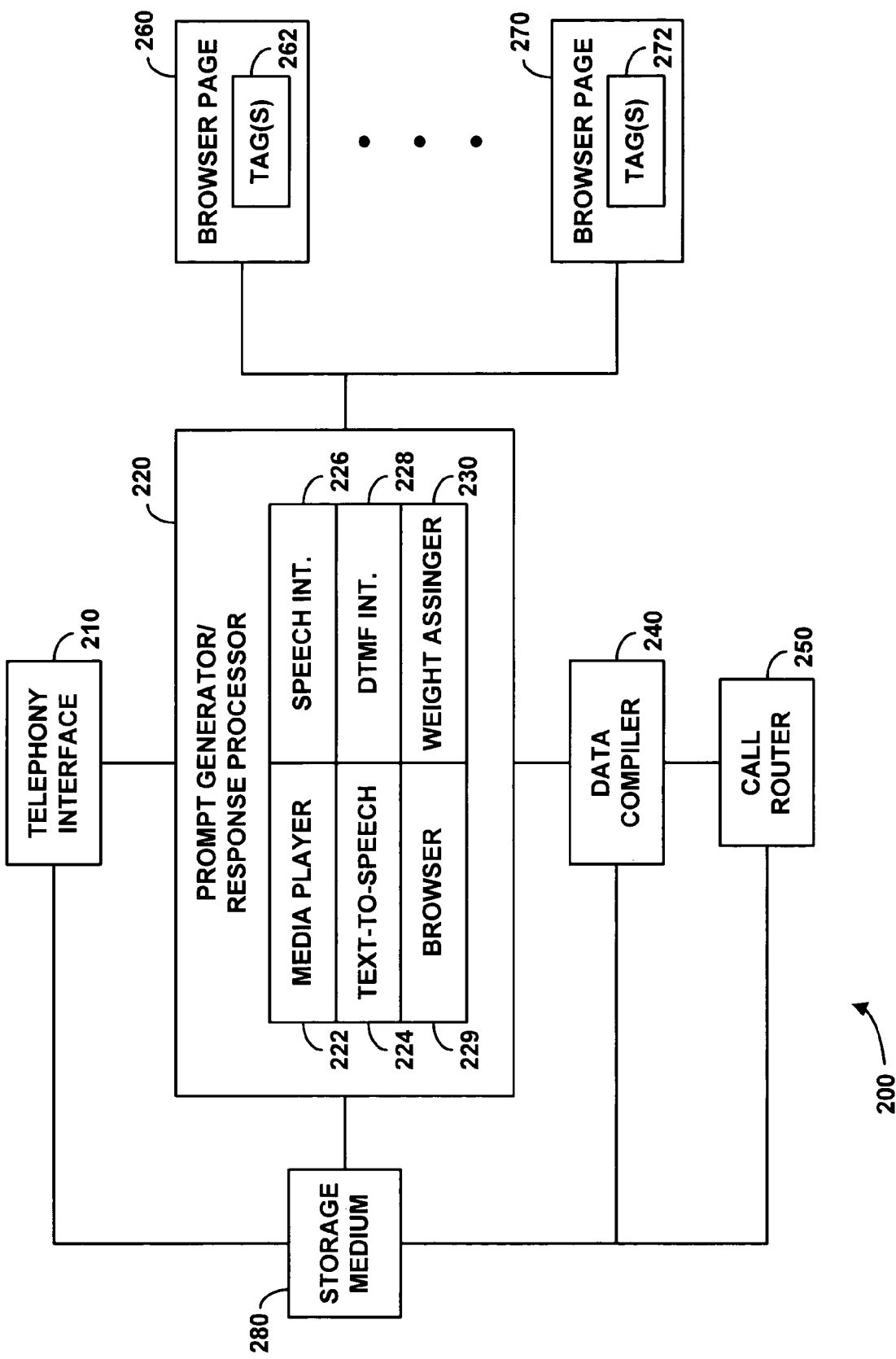
FIG. 2 is a block diagram illustrating a machine in accordance with an embodiment of the invention.

The assignment of weights may also be accomplished in any number of other fashions. For example, an application server environment that resides outside the telephony network may be used. Such a sever environment may comprise a prompt generator, a response processor, a data compiler and a weight assigner with the other functions being included in the telephony network, such as shown in FIGS. 1 and 2. Of course, any number of other configurations are also possible.

After the weights are processed, the overall weights are sent to a call routing unit 160 (hereafter "call router") that is coupled with the data compilation unit 155. The call router 160 may implement any number of possible call routing methods, such as heuristic methods that route the call to an appropriate location based on the one or more overall weights. Such methods include simulated-annealing methods, and traveling salesman problem solution methods. These techniques, along with other similar approaches, are known and will not be described in detail here.

For the "Example 1" above, the heuristic method would route the call based on the Classification weight of 10 and New Product weight of 10. For this particular example, due the caller's premium classification, the caller would be placed as the next caller to be serviced in a queue for a new product specialist CSR or group of new product specialist CSRs, such as one of the CSRs 170, 175, 180, 185 or 190.

Exemplary Machine for Processing Response in Call Routing System

Referring now to FIG. 2, a block diagram illustrating an exemplary machine 200 for routing an incoming call is shown. The machine 200 includes a number of aspects that are analogous with aspects of the system 100 shown in FIG. 1 and described above. Therefore, these aspects will not be described in detail again with respect to FIG. 2. The machine 200 includes a telephony interface 210 for receiving incoming calls. The telephony interface 210 may be voice modem or a data modem accepting VoIP information. In this regard, the telephony interface 210 may operate in substantially the same manner as the telephony interface of the system 100.

The machine 200 further comprises a prompt generator/response processor 220, which performs the functions of both the prompt generator 145 and the response processor 150 of the system 100. As may be seen in FIG. 2, the prompt generator/response processor 220 comprises a media player 222 and a text-to-speech (TTS) converter 224, which may provide for generating prompts (e.g. audio prompts) that are communicated to a caller via the telephony interface 210. The prompt generator/response processor 220 still further comprises a speech interpreter 226, which may take the form of a grammar based speech interpreter (e.g. speech recognition engine) for comparing received responses with expected responses, such as defined in a corresponding grammar. The machine 200 also comprises a DTMF interpreter for recognizing information entered by a caller depressing telephone keys, such as to enter an account number or the like.

Two components of the machine 200 (and the prompt generator/response processor 220) that are not explicitly shown in FIG. 1 are a browser 229 and a weight assigner 230. Depending on the particular embodiment, the system 100 shown in FIG. 1 may or may not include such components or features. For the machine 200, the browser 229 is used to navigate the prompt/response hierarchy of a particular customer care center call routing system. This aspect of the machine 200 will be described further below. The weight assigner 230 is employed to assign weights to a call based on the responses to the generated prompts that are received from a caller. In this respect, the weight assigner 230 contains appropriate logic that may implemented in hardware, software and/or firmware, for example, to assign such weights, as has been previously described.

The machine 200 still further comprises a data compiler 240 and a call router 250. Depending on the particular embodiment, these components of the machine 200 may operate in substantially the same manner as the data compiler 155 and the call router 160 of FIG. 1. Thus, the data compiler 240 and the call router 250 will not be described in further detail with respect to the machine 200.

For the machine 200, source information (e.g., data) for the prompts (e.g. text for TTS conversion or digital audio files) and the responses and/or assigned weights may be stored directly on a storage medium 280, which may take the form of a hard disk drive, for example. Alternatively, as is the case for the machine 200, the prompts and the responses and/or assigned weights are included/stored in interrelated browser pages, such as the browser pages 260 and 270. The browser pages 260 and 270 are operatively coupled with a call routing system, such as through software, firmware, hardware, or the like. The responses and/or assigned weights may be maintained in a customer call record, such as is described in further detail with respect to FIG. 3. It is noted that FIG. 2 is illustrative, and the browser pages 260 and 270 may be stored and maintained on the storage medium 280, or on any other suitable storage device. As is indicated in FIG. 2, the machine 200 may include any number of browser pages.

Depending on the particular embodiment, the browser pages 260 and 270 of the machine 200 and how weights are assigned to a call may be implemented in any number of ways. For example, the browsers pages miay be implemented so that a caller navigates from one browser page to another with the progression being dependent on the particular responses provided by the caller and the associated weights assigned based on those responses. Such browser pages may be implemented in extensible-markup-language (XML), voice-XML (VXML), or any other appropriate programming language for implementing such browser pages.

In certain embodiments, each browser page (e.g., 260, 270) includes appropriate logic to assign weights to events that occur during the call. In this context, an event may be defined as a single prompt and response sequence between the call routing system and the caller. In such an embodiment, each browser page would implement the functions of the weight assigner 230 and compile the weights assigned to the events that occur while the caller is interacting with (e.g., navigating) that particular browser page. Those weights may then be evaluated once navigation of that browser page has been concluded. Appropriate logic may be implemented in the browser page to determine the next action to be taken by the system 200. For example, the next action may be to route the call to another browser page in the system 200 based on the weights accumulated (e.g., by the current page and/or previous browser pages). Alternatively, the next action may be to route the call to an appropriate CSR to handle the caller's questions or resolve the matter for which they are calling about.

For such an embodiment that is implemented in, for example, VXML, the weights that are assigned may be stored in one or more attribute tags. These attribute tags may be passed from one browser page to another as the call is routed. Such attribute tags may be included in a customer call record, such as is described below with respect to FIG. 3. Of course, other possibilities for communicating weights that have been assigned to a call are possible. For example, software variables may be assigned to store assigned weights. These variables may then be passed from one browser page to another as parameters.

Alternatively, the caller's response to a prompt may be stored in an attribute tag. The receipt of a response from a caller may cause an "event", such as an XML or VXML event to occur. As a result of the event, the caller's response may be passed to the weight assigner 230 by the respective browser page. In such an embodiment, the weight assigner 230 acts as an "event" handler. The weight assigner 230 would then determine the appropriate weight associated with the response, which is communicated from the browser page to the weight assigner 230 in an attribute tag. The weight assigner 230 may then communicate the assigned weight (e.g., in the attribute tag) back to the browser page. Alternatively, the weight assigner 230 may simply retain the assigned weight until a trigger point is reached in the call routing system.

In such embodiments, the browser pages (e.g. 260, 270) and the weight assigner 230 may each include appropriate logic to cooperatively determine how to route a call once navigation of a particular browser page is complete. For example, if the assigned weights are retained in the weight assigner 230, the weight assigner would contain appropriate logic to determine whether a call should be routed to another browser page to collect further information from the caller, or if the called should be routed to a CSR (e.g., a trigger point has been reached). The logic implemented in the weight assigner 230 would then communicate this determination to the browser page and the cooperative logic implemented in the browser page would appropriately implement the next action by routing the call to another browser page or to an appropriate CSR in the situation where a trigger point has been encountered.

The service logic of the system 200 may be generated in any number of ways. For example, a programmer could implement each browser page and the logic for each component of the machine 200. Alternatively, the service logic could be defined by a customer call center application development program. Such a program would implement programming features to allow a customer call center developer to define the audio prompts that are to be used by the call center application and also define the associated responses that will be recognized for each prompt. The program would also provide for defining the relationships between the prompts. For example, certain responses to a first prompt may result in a second prompt being generated (e.g., a second browser page being loaded), while other responses to the first prompt may result in a third prompt or fourth prompt being generated.

Such a customer call center application development program could also implement programming features to define the respective weights associated with certain responses to their respective prompts. Depending on the particular implementation, these prompts, expected responses, and weights may be implemented in one or more browser pages and/or a weight assigner, as previously described. The call center application development program may further include programming features to define trigger points of the customer call center. Such trigger points may indicate situations where a call is routed to a CSR, or that the call is considered to be complete and should be disconnected, among any number of other actions that may be taken in handling (routing) the call. Such a customer call center development application program may be implemented in any number of ways, and those of skill in the art of software programming will now contemplate any number of possible ways to carry out implementing such features.

Exemplary Call Information Record

Figure 3:
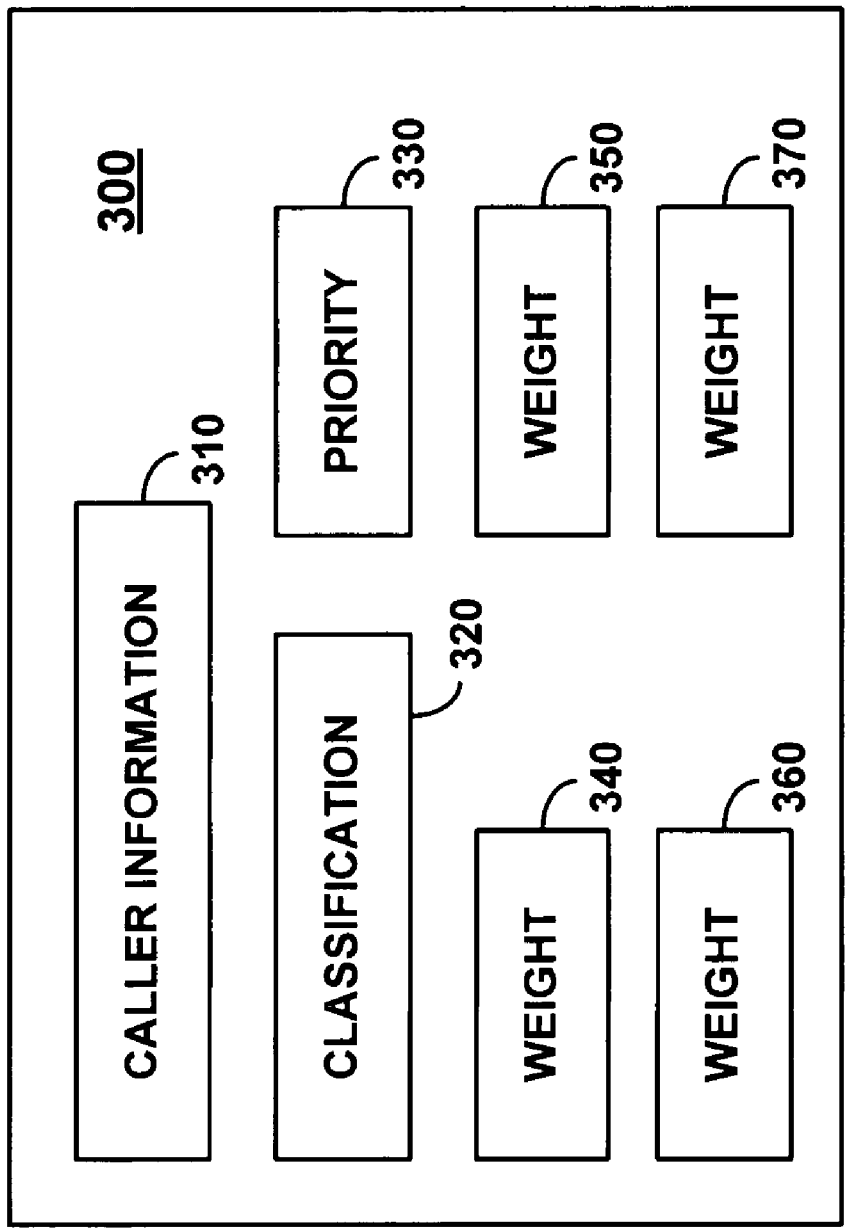
FIG. 3 is a is a block diagram illustrating, in schematic format, a call record including information and weights assigned to a call during routing of the call in accordance with an embodiment of the invention.

Referring now to FIG. 3, a diagram showing an exemplary customer call record 300 is shown. As was described above, attribute tags, such as VoiceXML tags may be used to store responses and/or assigned weights. Thus, the customer call record 300, for such embodiments, may take the form of a plurality of VoiceXML attribute tags. The customer call record 300 comprises a caller information tag 310, which may be the caller's name, an account number or a generic designator (e.g., preferred customer, potential customer, etc.) The customer call record 300 also comprises a classification weight tag 320, a priority weight tag 330, and a plurality of other weight tags 340, 350 360 and 370, which may be weight tags for any number of categories that are defined by the programming features of an application for implementing call routing methods for a customer care call center, as previously discussed. Of course, the customer call record 300 may contain additional tags and/or eliminate any of the tags shown in FIG. 3. In certain embodiments, weights may be associated with one or more specific categories. Therefore, a single weight may contribute to the overall weight for each of the categories with which it is associated.

The customer call record may be communicated (e.g. by the browser 229 of the machine 200) from a current browser page to each of the successive browser pages accessed during a call that is being routed. Thus, the weights and information gathered at each point in the process of call routing are passed forward to successive browser pages. Once a trigger point is reached, the weights and information gathered at each browser page may be passed to the data compiler (e.g., the data compiler 240 of machine 200) to be processed. The trigger point may be an event defined trigger (based on the occurrence of a specific event) or may be dependant on the weights and categories being assigned and sent as part of the particular call routing system and/or machine. The data compiler may then pass the overall weights to a call router (e.g., the call router 250) to facilitate routing the call to an appropriate CSR.

Exemplary Method for Routing a Call

Figure 4:
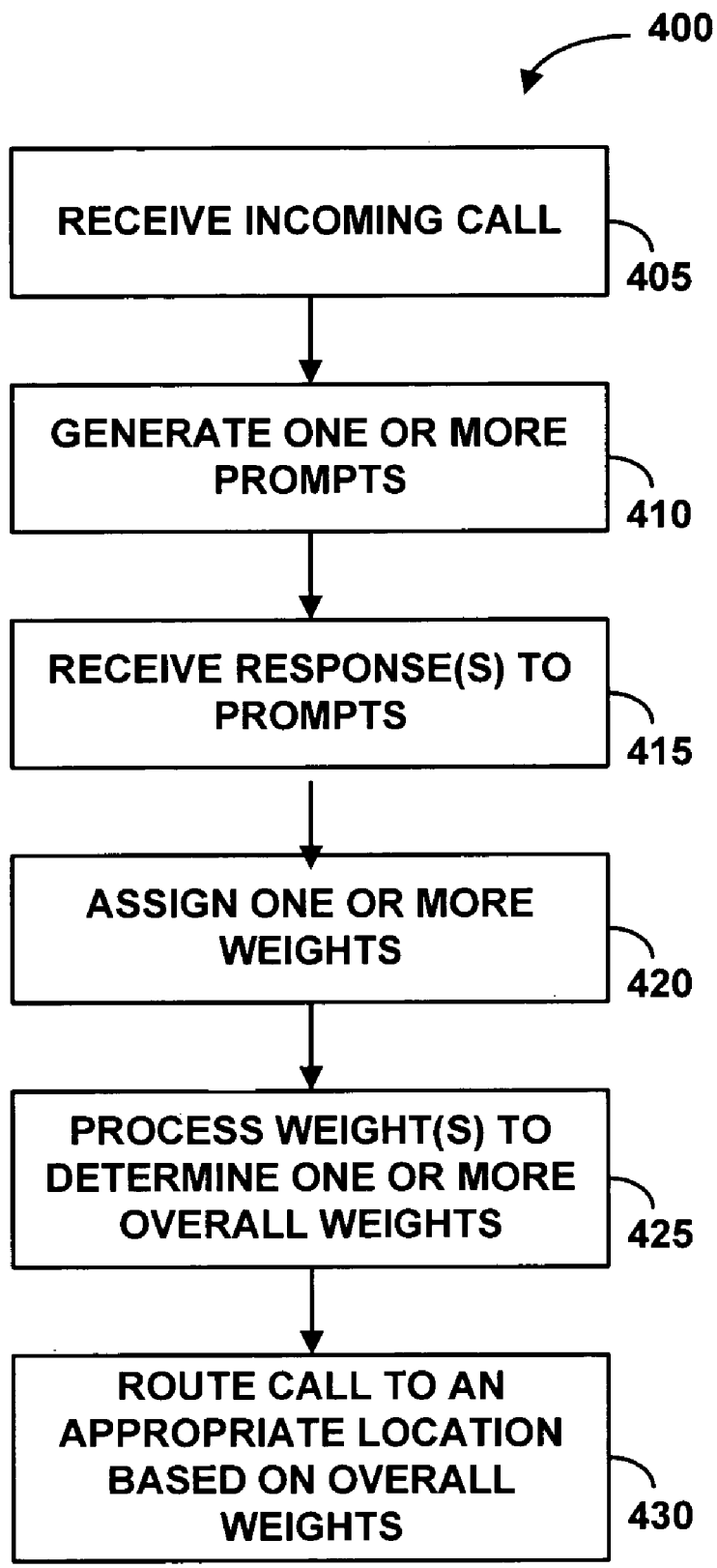
FIG. 4 is a flowchart illustrating a method of routing incoming calls in accordance with an embodiment of the invention.

Referring now to FIG. 4, a flowchart illustrating an exemplary method 400 for routing an incoming call, such as to a customer care center, is shown. The method 400 comprises, at block 405, receiving the incoming call, such as with a telephony interface. The method further comprises, at block 410, generating one or more prompts to solicit respective responses from the caller, which may be done using the techniques described above (e.g., TTS conversion or playing digital audio files). At block 415, the method 400 comprises receiving, from a caller, responses to the prompts. At block 420, one or more weights are assigned, such as has been previously described. At block 425, the weights are processed to determine one or more overall weights. Processing the weights may include performing an arithmetic operation on the weights assigned in each category to determine an overall weight. For example, the individual weights in each category may be summed or multiplied, as two examples. Alternatively, weighted averages or even more complex arithmetic calculations may be performed. At block 430, the call is routed to an appropriate location (e.g., CSR or group of CSRs) based on the overall weights determined at block 420. As was previously discussed, the call may be routed using any number of heuristic routing techniques.

CONCLUSION

Exemplary arrangements of the present invention have been described herein. It will be appreciated, however, that those skilled in the art will understand that changes and modifications may be made to these arrangements without departing from the true scope and spirit of the present invention, which is defined by the following claims.

What is claimed is:

1. A system for routing an incoming call from a caller comprising:
   a telephony interface for receiving the incoming call from the caller;
   a prompt generation unit coupled with the telephony interface for generating one or more prompts to solicit corresponding responses from the caller;
   a response processing unit coupled with the telephony interface and the prompt generation unit for receiving, from the caller, responses to the one or more prompts and processing the responses to assign one or more respective weights to the call, the one or more respective weights corresponding to each of the responses;
   a data compilation unit coupled with the prompt generation unit and the response processing unit, wherein the data compilation unit processes the assigned weights to determine one or more overall weights of the call;
   a call routing unit coupled with the data compilation unit that routes the call to an appropriate location using a call routing algorithm based, at least in part, on the one or more overall weights of the call; and
   a browser, wherein the prompts are included in one or more browser pages that are operatively coupled in the system, wherein the browser comprises a voice browser and the browser pages are implemented with VoiceXML, and wherein the respective weights are stored in one or more attribute tags that are communicated between at least two of the one or more browser pages.

2. The system of claim 1, wherein at least one of the data compilation unit and the call routing unit determines at least one of a priority of the call and a classification of the call, and wherein the call routing unit routes the call based on at least one of the priority of the call and the classification of the call.

3. The system of claim 1, wherein the prompt generation unit generates prompts using text-to-speech conversion.

4. The system of claim 1, wherein the prompt generation unit generates prompts using digital audio files.

5. The system of claim 1, wherein the responses are stored in one or more attribute tags that are communicated between at least two of the one or more browser pages.

6. The system of claim 1, wherein the browser pages are generated by an application providing programming features to:
   define the one or more prompts;
   define relationships between the one or more prompts;
   define the respective weights associated with specific responses from the caller; and
   define one or more trigger points at which the data compilation unit will process the respective weights prior to determine the one or more overall weights used for routing the call.

7. The system of claim 1, wherein the responses comprise at least one of spoken responses and dual-tone-multi-frequency responses.

8. The system of claim 1, wherein the call routing unit employs a heuristic routing method.

9. The system of claim 8, wherein the heuristic routing method comprises one of a simulated-annealing method and a traveling-salesman problem solution method.

10. The system of claim 1, wherein the respective weights and the one or more overall weights include a plurality of weight types that may be used by the call routing unit when routing the call.

11. The system of claim 1, wherein the browser pages are implemented as part of a customer care center call routing application.

12. The system of claim 1, wherein the respective weights and the at least one overall weight include a plurality of weight types.

13. In a call routing system for routing an incoming call from a caller, wherein the system comprises a telephony interface, a prompt generation unit; a voice response unit; a data compilation unit and a call routing unit, an article of manufacture comprising:
   a storage medium having a plurality of machine-readable instructions stored thereon, wherein the instructions, when executed, provide for:
   receiving the incoming call;
   generating a plurality of prompts to solicit respective responses from the caller, wherein the prompts are included in and generated from voice browser pages;
   receiving, from the caller, the respective responses;
   assigning multiple weights to the call based upon the responses;
   communicating the weights in one or more attribute tags between at least two of the voice browser pages;
   processing the weights to determine one or more overall weights of the call; and
   routing the call to an appropriate location based, at least in part, on the one or more overall weights of the call.

14. The article of claim 13, wherein generating the one or more prompts comprises generating one or more text-to-speech prompts.

15. The article of claim 13, wherein generating the one or more prompts comprises playing one or more digital audio files.

16. The article of claim 13, wherein receiving the responses comprises receiving at least one of spoken responses and dual-tone-multi-frequency responses.

17. The article of claim 13, wherein assigning the weights comprises assigning the respective weights in a plurality of categories associated with the call.

18. The article of claim 13, wherein processing the weights comprises performing an arithmetic operation on the one or more respective weights to obtain the one or more overall weights.

19. The article of claim 18, wherein performing the arithmetic operation comprises calculating one or more sums from the one or more respective weights.

20. The article of claim 18, wherein performing the arithmetic operation comprises calculating one or more products from the one or more respective weights.

21. The article of claim 13, wherein routing the call comprises routing the call using a heuristic method.

22. The article of claim 21, wherein routing the call further comprises routing the call using one of a simulated-annealing method and a traveling-salesman problem solution method.

23. A method for routing an incoming call from a caller comprising:
- receiving the incoming call;
- generating one or more prompts to solicit respective responses from the caller;
- receiving, from the caller, the respective responses,
- assigning one or more respective weights to the call, the one or more respective weights corresponding to each of the one or more respective responses;
- processing the weights to determine one or more overall weights of the call; and
- routing the call to an appropriate location based, at least in part, on the one or more overall weights of the call,
- wherein the prompts are included in voice browser pages implemented with VoiceXML, the method further comprising storing the respective weights in one or more attribute tags that are communicated between at least two of the voice browser pages.

24. The method of claim 23, wherein assigning the one or more respective weights comprises assigning the respective weights in a plurality of categories associated with the call.

25. The method of claim 24, wherein processing the weights comprises performing an arithmetic operation on the one or more respective weights to obtain a plurality of overall weights corresponding to the plurality of categories.

26. The method of claim 25, wherein performing the arithmetic operation comprises calculating a sum.

27. The method of claim 25, wherein performing the arithmetic operation comprises calculating a product.

28. The method of claim 23, wherein routing the call comprises routing the call using a heuristic method.

29. The method of claim 28, wherein routing the call further comprises routing the call using one of a self-annealing method and traveling salesman problem solution method.

* * * * *

UNITED STATES PATENT AND TRADEMARK OFFICE
CERTIFICATE OF CORRECTION

PATENT NO.         : 7,602,899 B1                                       Page 1 of 1
APPLICATION NO. : 10/781966
DATED              : October 13, 2009
INVENTOR(S)        : Balaji S. Thenthiruperai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1639 days.

Signed and Sealed this

Fifth Day of October, 2010

David J. Kappos
*Director of the United States Patent and Trademark Office*